United States Patent [19]

Hara et al.

[11] Patent Number: 5,045,362

[45] Date of Patent: Sep. 3, 1991

[54] PROCESS FOR PRODUCING MODIFIED MOLDED POLYMER ARTICLE

[75] Inventors: Shigeyoshi Hara; Umewaka Nakatani, both of Iwakuni, Japan

[73] Assignee: Hercules Incorporated, Wilmington, Del.

[21] Appl. No.: 451,703

[22] Filed: Dec. 18, 1989

[30] Foreign Application Priority Data

Dec. 20, 1988 [JP] Japan ................... 63-319461

[51] Int. Cl.$^5$ .................. B29C 45/00; B29C 71/00
[52] U.S. Cl. .................... 427/400; 264/232; 264/340; 264/343
[58] Field of Search .......... 264/83, 232, 328.6, 264/331.13, 340, 343; 525/331.9, 332.1, 332.3, 333.1, 355, 359.1, 359.5, 359.6; 528/487, 491, 495, 496, 497, 498, 499, 502; 427/400

[56] References Cited

U.S. PATENT DOCUMENTS

| | | | |
|---|---|---|---|
| 2,631,984 | 3/1953 | Crawford et al. | 525/332.1 X |
| 3,220,993 | 11/1965 | Blatz | 525/332.1 X |
| 3,758,450 | 9/1973 | Margrave et al. | 525/332.3 X |
| 3,992,221 | 11/1986 | Homsy et al. | 264/83 X |
| 4,228,254 | 10/1980 | Powers et al. | 525/355 X |
| 4,300,970 | 11/1981 | Honda et al. | 264/328.1 X |
| 4,400,340 | 8/1983 | Klosiewicz | 264/328.6 |
| 4,621,107 | 11/1986 | Lagow et al. | 522/131 |
| 4,918,146 | 4/1990 | Matlack | 525/355 X |

FOREIGN PATENT DOCUMENTS 58-129013 8/1983 Japan .

Primary Examiner—Leo B. Tentoni
Attorney, Agent, or Firm—william S. Alexander; Marion C. Staves

[57] ABSTRACT

A metathesis polymerized cycloolefin article may be improved by treating with halogen halide in an organic solvent. Degree of treatment can be regulated according to the swelling power of the solvent for the polymer. Improved properties include improved flame retardance, oxidation resistance and surface properties.

17 Claims, No Drawings

PROCESS FOR PRODUCING MODIFIED MOLDED POLYMER ARTICLE

The present invention relates to a molded polymer article prepared by the simultaneous polymerization and molding of a metathesis polymerizable cycloolefin in the presence of a metathesis polymerization catalyst.

More particularly, the invention relates to a process for producing a modified molded polymer article having improved flame retardance and improved surface properties by contacting said molded polymer article with a hydrogen halide, thereby hydrohalogenating unsaturated carbon-carbon double bonds in the recurring unit of the polymer.

It is known that ring-opened polymers are produced from cycloolefins by the use of a metathesis polymerization catalyst system. A process has been proposed to obtain a molded polymer article by carrying out the polymerization and molding of a metathesis polymerizable cycloolefin such as dicyclopentadiene (DCPD) in one step in a mold using a metathesis polymerization catalyst. More particularly, a process has been proposed to obtain a molded polymer article, taking advantage of the fact that a metathesis polymerization catalyst system is composed of two components consisting of a catalyst component such as, e.g., tungsten chloride and an activator component such as an alkylaluminum, by using two kinds of solutions each containing one of the above components and a monomer, quickly mixing the solutions and injecting the mixture into a mold (for example, cf. Japanese Patent Laid Open Sho 58-129013).

Such processes are very attractive from the industrial viewpoint because large-sized molded articles having excellent properties can be produced with inexpensive low pressure molds. However, it has been found that various improvements on the process are necessary for some applications.

Impartment of flame retardance to the polymer is one problem to be solved. Since the polymer is principally composed of hydrocarbon repeating units containing unsaturated bonds, it is highly combustible once ignited. Therefore, a polymer having improved flame retardance is frequently required according to the intended use.

Improved flame retardance can be imparted to the polymer by introduction of a halogen either into the polymer molecule or as an additive to the polymer composition. Examples of processes for achieving this purpose include using a halogen atom-containing metathesis polymerizable cycloolefin as at least a part of the monomer components, the addition of a halogen-containing low molecular weight compound containing a large amount of halogen such as decabromodiphenyl ether or a halogen-containing polymer containing a large amount of halogen such as a poly(bromostyrene). The first process is, in principle, a highly desirable technique for obtaining a flame-retardant polymer. However, the method is commercially impractical. Such a halogen-containing monomer is not available as a raw material in commercial production. The use of a low-molecular weight or polymeric halogen-containing flame retardant is easiest to practice because a commercially available flame retardant meets the purpose. However, such flame retardants are usually sparingly soluble in cycloolefins used as the monomer and, consequently, the reactive solution becomes non-uniform on standing due to precipitation of the flame retardant. Such precipitation causes handling difficulties during molding and is also detrimental to physical properties of the molded polymer.

According to the present invention, a process is provided for producing a flame retardant molded polymer article which comprises contacting said molded article produced by the simultaneous reaction and molding of at least one metathesis polymerizable cycloolefin in the presence of a metathesis polymerization catalyst with a hydrogen halide, said contacting being carried out in the presence of an organic solvent or water.

Any molded article produced by conventional processes for the production of metathesis molded polymer articles can be treated by the process of this invention. The treatment is effected by simply contacting the article with the hydrogen halide in a solvent at room temperature or thereabout. Since the treatment takes place at least on the surface of the article, surface properties, in addition to flame retardance, will be affected. Specifically, the treatment increases oxidation resistance and also decreases the gas permeability of the surface and thus reduces the amount of oxygen which reaches the interior of the polymer where it can cause oxidative degradation.

Additionally, the molded article treated with a hydrogen halide has a hard surface with black luster and a surface decoration effect similar to the black coating or the black pigmentation can be attained even by a surface treatment which is ineffective in imparting flame retardance.

Any hydrogen halide including hydrogen chloride, hydrogen bromide, hydrogen fluoride, hydrogen iodide and the like can be used in the present process, among which hydrogen chloride is most preferable taking consideration of the cost and handleability in addition to the abovementioned finding that the added halogen atom is not the sole factor to develop the flame-retarding effect.

The inventors have found that, surprisingly, treatment with a hydrogen halide results in essentially no weight increase which one would expect to accompany addition of halogen by hydrohalogenation. Nevertheless, the flame-retarding effect of the hydrogen halide treatment is generally superior to that of treatment with molecular halogen where considerable weight increase is observed. The flame-retardant effect of the hydrogen halide treatment which introduces only one halogen atom into each double bond, when considered simply as a process for the introduction of halogen was naturally expected to be lower than that of the molecular halogen treatment which introduces two halogen atoms into each double bond. However, as stated above, the treatment with a hydrogen halide has a generally superior effect. Since the hydrogen halide can be handled more easily than molecular halogen because of its relatively lower toxicity, the treatment with a hydrogen halide is an extremely practical method.

The above facts suggest that the expected addition reaction of the hydrogen halide to the double bond in the metathesis polymer is not the exclusive reaction occurring in the hydrogen halide treatment of the present invention. The details of the mechanism of the reaction are not clear at present; however, the above effect is believed to be caused by the repetition of the addition reaction of the hydrogen halide and the simultaneous elimination reaction of hydrogen halide at a different site.

Although hydrogen halide can be brought into contact with a molded metathesis polymer article in gaseous or pressurized liquid state, a particular apparatus is required for the the handling of the hydrogen halide in gaseous or pressurized liquid state because of its high corrosivity and acidity. In contrast the process to contact a hydrogen halide with a molded polymer article according to the present invention where it is in the state of solution in a solvent is a preferable process which can be carried out with relatively simple procedures.

The use of a solvent is effective in controlling the thickness of the treated layer. For realizing the flame-retarding treatment by the hydrogen halide treatment, a layer of a considerable thickness in the molded article should be subjected to the treatment and it is necessary to swell the layer with a solvent to facilitate the permeation of the hydrogen halide to a sufficient thickness and at a sufficient concentration. In other words, the thickness of the treated layer can be controlled by the swelling power of the solvent to the polymer. The solvent should be unreactive with the hydrogen halide and free from any suppressing effect on the activity of the hydrogen halide with the carbon-carbon double bond.

The solvents can be classified into three main groups according to the purpose of the treatment.

In the case of using the hydrogen halide treatment for the purpose of flame retarding as mentioned above, it is necessary that the solvent have considerable swelling power to the metathesis polymer. Examples of such solvents include halogenated hydrocarbons having one to six carbon atoms, especially one to three carbon atoms, aromatic hydrocarbons having six to nine carbon atoms, and also their halides.

Concrete examples of the former compounds are preferably chlorinated hydrocarbons such as methylene chloride, chloroform, carbon tetrachloride, 1,1-dichloro-ethane, 1,2-dichloroethane, 1,1,2-trichloroethane, 1,1,1,2-tetrachloroethane, trichloroethylene, perchloroethylene and the like, and examples of the latter compounds are toluene, xylene, ethylbenzene, chlorobenzene and the like. These solvents are volatile and various problems may occur in the use of the treated article when the solvents are not removed, in principle, from the molded polymer article after the treatment. Practically, the complete removal of the treatment solvent from the treated article requires considerable time, thereby increasing the cost. In some cases, it may be advantageous in practice to select a solvent having rather low volatility and higher molecular weight and acting as a plasticizer if left in the treated layer of the molded polymer article. Furthermore, the selection of a low-volatile solvent having the action of flame retardant by itself is also advantageous in improving flame retardance.

Examples of such solvents are halogenated paraffins such as chlorinated paraffin, brominated paraffin and the like, phosphoric acid esters such as tricresyl phosphate, phosphoric acid ester of a halogen-containing hydroxide such as tris(bromophenyl) phosphate, tris(chloroethyl) phosphate and the like.

The solvents to be used in the flame-retarding treatment frequently do not have sufficiently high solubility of hydrogen halide and, accordingly, the treatment is preferably carried out under continuous introduction of hydrogen halides into the treatment system according to the need.

In the case of performing the hydrogen halide treatment for the purpose of surfacetreatment such as black decoration of the surface, the purpose can be achieved by the treatment of only an extremely thin surface layer of the molded article. The solvent suitable for this purpose need not have high swelling power for the polymer. Rather, it is preferably one having high affinity for the hydrogen halide and capable of stably dissolving the halide at high concentration. The concrete example of such solvent to be cited first is water, however, other protonic polar solvents such as ethanol, isopropanol and the like or aprotic polar solvents such as N-methylpyrrolidone, dimethylformamide and the like can be used as the solvent.

The treatment of the present invention is carried out preferably by contacting a molded polymer article with a hydrogen halide in the presence of the above-mentioned solvent at a temperature between normal temperature and generally 100° C. The rate of treatment increases generally with increasing temperature. However, the high-temperature treatment causes various problems such as lowering of the solubility of hydrogen halide in the solvent, the deformation of the molded article and difficulty in handling a corrosive hydrogen halide at high temperature. Accordingly, a proper temperature can be selected according to the factors such as purpose, apparatus, cost and the like. The treating time can be also properly selected according to the required effect and is generally between 0.05 and 24 hours.

The treated article is dried, as mentioned above, to remove the residual treating solvent. Prior to the drying treatment, the article may be rinsed with or immersed in an alkaline solution to remove residual free hydrogen halide.

Any molded polymer article produced by using at least one metathesis polymerizable cycloolefin as at least a part of the monomer component and carrying out the reaction molding of the monomer in the presence of a metathesis polymerization catalyst can be treated by the treatment of the present invention, because the article contains at least one carbon-carbon double bond in the repeating unit of the constituent polymer and the halogen can be added to the double bond by the modification treatment of the present invention.

Especially preferable article is a crosslinked molded polymer article produced by using a main monomer component consisting of metathesis polymerizable cycloolefins containing a cycloolefin having two or more metathesis polymerizable cycloolefin groups as at least a part of the main monomer component. Polymerization is effected by preparing two reactive solutions A and B, one containing a catalyst component and one containing an activator component together with the monomers, quickly mixing the solutions, for example by impingement mixing, and pouring the mixture into a mold to effect the reaction.

The metathesis polymerizable cycloolefin is preferably one having a high degree of ring strain because of its high polymerizability. Especially, a group having norbornene structure is preferable from the viewpoint of the ease of production and high polymerizability.

Preferable concrete examples of metathesis polymerizable cycloolefins include dicyclopentadiene, tricyclopentadiene, 1,4,5,8-dimethano-1,4,4a,5,8,8a-hexahydronaphthalene, 1,4,5,8,9,10-trimethano-1,4,4a,5,8,8a,9,9a,10,10a-decahydroanthracene, 1,2-addition compound of 1,5-cyclooctadiene, and cyclopentadiene, ethylenebisnorbornene, phenylenebisnorbornene, norbornene, norbornadiene, 5-methylnorbornene, 5-ethylidenenorbornene, 5-phenylnorbornene, vinylnorbornene, dihydrodicyclopentadiene, cyclopentadiene-methylcyclopentadienecodimer, 1,4,5,8-dimethano-1,4,4a,5,6,7,8,8a-octahydronaphthalene, 6-methyl-1,4,5,8-dimethano-1,4,4a,5,6,7,8,8a-octahydronaphthalene, and 6-ethylidene-1,4,5,8-dimethano-1,4,4a,5,7,8-,8a-heptahydronaphthalene.

In the present invention, other cycloolefins containing hetero atom, in other words cycloolefins having a polar group may be used as a part of the monomer in addition to the cycloolefins composed solely of hydrocarbons. The polar group is preferably an ester group, ether group, cyano group, N-substituted imido group or halogen.

Examples of the copolymerizing monomer include 5-methoxycarbonylnorbornene, 5-(2-ethylhexyloxy)-carbonyl-5-methylnorbornene, 5-phenyloxymethylnorbornene, 5-cyanonorbornene, 6-cyano-1,4,5,8-dimethano-1,4,4a,5,6,7,8,8a-octahydronaphthalene, N-butylnadic acid imide, 5,6-dichloronorbornene and the like.

It is required that the metathesis polymerizable polycyclic cycloolefins be those containing the lowest possible amount of impurities which inactivate the metathesis polymerization catalyst.

The preferable monomer composition for the molded polymer article of the present invention is a combination of 100 to 50 mol % of dicyclopentadiene, the remaining part being at least one other metathesis polymerizable cycloolefin having the norbornene structure unit mentioned above.

As the catalyst component of the metathesis polymerization catalyst system used in the production of the molded polymer article of the present invention are used salts such as halides of tungsten, rhenium, tantalum, molybdenum and the like, especially tungsten and molybdenum compounds. Among preferred compounds are tungsten and molybdenum halides and oxyhalides. More particularly, tungsten hexachloride and tungsten oxychloride are preferred. Organo ammonium tungstate or molybdate may also be used. However, some of these tungsten or molybdenum salt compounds undesirably initiate cationic polymerization immediately when added directly to the monomer. A Lewis base or a chelating agent can be added to the catalyst in an amount of about 1 to 5 mol per 1 mol of the tungsten compound in order to prevent undesirable polymerization. Those additives may include acetylacetone, acetoacetic acid alkyl esters, tetrahydrofuran, benzonitrile and the like. Under such situations, the monomer solution (Solution A) containing the catalyst component has sufficiently high stability for practical use. It is also sometimes desirable that the tungsten salt compounds be previously suspended in an inert solvent such as benzene, toluene or chlorobenzene and solubilized by the addition of a small amount of an alcoholic compound or a phenolic compound.

The activator components of the metathesis polymerization catalyst system include organometallic compounds chiefly comprising alkylated compounds of metals of group I—group III in the periodic table, preferably, tetraalkyltins, trialkyltin hydrides, alkylaluminum compounds and alkyl-aluminum halide compounds such as diethylaluminum chloride, ethylaluminum dichloride, trioctylaluminum, dioctylaluminum iodide, tetrabutyltin and tributyltin hydrides. The organometallic compound used as the activator component is dissolved in the monomer mixture to form the other reactive solution (Solution B) containing the activator.

According to the present invention the molded polymer articles are produced by mixing the Solution A with the Solution B. The polymerization reaction, however, starts very rapidly when the above-mentioned composition is used and, consequently, undesirable initiation of hardening can occur before the mold is completely filled with the mixed solution. In order to overcome the problem, it is preferable to use a polymerization moderating agent. As such moderators are generally used Lewis bases, particularly, ethers, esters, nitriles and the like. Examples of the moderators include ethyl benzoate, butyl ether, diglyme and the like. Such moderators are generally added to the solution containing the activator component comprising the organometallic compound. When a monomer having a polar group and acting as a Lewis base is used in the reactive solution, the monomer may be used to play the role of the moderator.

When a tungsten compound is used as the catalyst component, the ratio of the tungsten compound in the metathesis polymerization catalyst system to the above-mentioned monomers is about 1000:1 to about 15000:1, and preferably about 2000:1 on the molar basis. When an alkylaluminum compound is used as the activator component: the ratio of the aluminum compound to the above-mentioned monomers is about 100:1 to about 2000:1 and preferably around a ratio of about 200:1 to about 500:1 on the molar basis. The amount of the moderator may be adjusted by experiments depending upon the amount of the catalyst system.

In order to decrease the residual monomer content, a small amount of an active halogen compound such as trichloromethyl toluene, ethyl trichloroacetate, isophthaloyl chloride and the like or an acid anhydride such as benzoic anhydride may be added in the production of the molded polymer article of the present invention.

A variety of additives may be used in the molded polymer article of the present invention to improve or to maintain characteristics of the molded articles. The additives include fillers, pigments, antioxidants, light stabilizers, flame retardants, macromolecular modifiers and the like. These additives have to be added to the starting solutions, since they cannot be added after the solutions are polymerized to the molded polymer article. Such additives may be added easily to either one or both of the Solution A and the Solution B. The additives should be ones being substantially unreactive with the highly reactive catalyst component, activator component and acid anhydrides in the solutions to avoid practical troubles and they have no inhibitory action to polymerization. If a reaction between the additive and the catalyst component or the activator component is unavoidable, but does not essentially inhibit the polymerization, the additives can be mixed with the monomers to prepare a third solution, and the third solution is mixed with the first and/or second solutions immediately before polymerization. When the additive is a solid filler forming gaps which can be filled sufficiently with both solutions immediately before or during the polymerization reaction, the mold may be filled with the filler prior to charging the reactive solutions into the mold.

The reinforcing materials or fillers used as additives can improve flexural modulus of the polymer. These include glass fibers, mica, carbon black, wollastonite and the like.

The molded polymer article used in the present invention preferably contain an antioxidant. Preferably, a phenolic- or amine-antioxidant is added to the solution in advance. Examples of the antioxidants include: 2,6-t-butyl-p-cresol, N,N-diphenyl-p-phenylenediamine, and tetrakis[methylene(3,5-di-t-butyl-4-hydroxycinnamate)]-methane.

The molded polymer articles of the present invention may also contain other polymers, which are added to the monomer solution. Among polymers, elastomers are most used, since the addition of elastomer is effective in improving the impact strength of the molded articles and controlling the viscosity of the solution. Examples of the elastomers to be used for the above purpose include, e.g., a wide variety of elastomers such as styrene-butadiene-styrene triblock rubber, styrene-isoprene-styrene triblock rubber, polybutadiene, polyisoprene, butyl rubber, ethylene-propylene-diene terpolymer and nitrile rubber.

As described above, the molded polymer articles to be used in the present invention are prepared by reaction molding.

The molding method of the article include, as mentioned above, a resin (also known as "resin transfer") process comprising the mixing of a catalyst and a monomer with a static mixer or the like in advance and the injection of the produced premix into a mold and a RIM process comprising the impingement mixing of the Solution A and the Solution B containing divided catalyst system in a mix head and the substantially immediate injection of the mixture into the mold. The RIM process is generally used.

In both of RIM process and resin injection process, the mixture can be introduced into the mold under relatively low pressure, so that an inexpensive mold is usable. The temperature in the mold increases rapidly by the heat of reaction upon the start of the polymerization reaction in the mold, so that the polymerization reaction is completed in a short time. The molded article of the invention can be removed easily from the mold without using a mold release agent.

The modified product produced by the present invention can be subjected to various post-treatment processes such as coating and adhesion similar to the conventional untreated metathesis molded polymer article. However, the product may be used without coating when it is to be used in a state of black surface.

The molded article treated by the above processes can be used in a variety of uses, particularly the uses required to have a certain extent of flame retardance according to the need, for example, parts of various transportation vehicles on ground, water or snow including automobiles, motorbikes, golf carts, snowmobiles, boats, hydroscooters, sand buggies and tractors.

The invention described herein is illustrated in detail by the following Examples and Comparative Example. These examples are solely for explanation and do not limit the scope of the invention.

EXAMPLES 1-3

Preparation of molded plate for halogenation treatment:

Tungsten hexachloride (20 parts by weight) was added to 70 parts by volume of anhydrous toluene under nitrogen. The obtained mixture was mixed with a solution consisting of 21 parts by weight of nonylphenol and 16 parts by volume of toluene to obtain a catalyst solution containing 0.5 M of tungsten. The solution was purged with nitrogen overnight to remove the hydrogen chloride gas formed by the reaction of tungsten hexachloride and nonylphenol. A catalyst solution for polymerization was prepared by adding 1 part by volume of acetylacetone to 10 parts by volume of the solution produced by the above procedure.

A monomer mixture consisting of 95 parts by weight of purified dicyclopentadiene and 5 parts by weight of purified ethylidenenorbornene was added with 3 parts by weight of an ethylene-propylene-ethylidenenorbornene copolymer rubber having an ethylene content of 70 mol % and with 2 parts by weight of Ethanox 702 as an oxidation stabilizer. The obtained solution was added with the above catalyst solution for polymerization in an amount to give a tungsten content of 0.001 M and obtain a catalyst component solution (Solution A).

A mixed solution of polymerization activator was prepared by mixing trioctylaluminum, dioctylaluminum iodide and diglyme at molar ratios of 85:15:100. The mixed solution was added to a mixture consisting of 95 parts by weight of purified dicyclopentadiene, 5 parts by weight of purified ethylidenenorbornene and 3 parts by weight of the above-mentioned ethylene-propylene-ethylidenenorbornene copolymer rubber in an amount to give an aluminum content of 0.003 M to obtain an activator component solution (Solution B).

A molded plate of a metathesis polymer having a thickness of 3 mm was produced from the Solution A and the Solution B prepared above using a reaction injection molding machine. The liquid temperature and the mold temperature in the injection were 30° C. and 80° C., respectively.

The molded plate prepared above was cut to form sample plates having a dimension of 12.5 cm × 1.25 cm × 3 mm. The sample plates were immersed in various kinds of solvents shown in Table 1 for respective prescribed periods at normal temperature while blowing dried hydrogen chloride into the solvent. The treated plates were dried at 60° to 70° C. for 3 days in vacuum and the ratios of weight increase were measured. The treated sample was clamped at an end with a clamp and held in horizontal state. The other end of the sample was ignited with a gas burner for 30 seconds and the period to burn 10 cm of the sample after the start of ignition or, if the sample was self-extinguished in the middle, the period from the ignition to the self-extinguishment were also measured. The surfaces of all the samples were black in color and the the samples were hardened while maintaining flexibility.

For comparison, the samples were immersed for the same periods in pure solvent without adding hydrogen chloride and the tests of weight increase and combustibility were carried out after drying. The surfaces of the samples had yellowish brown color which was the color of the original samples and there was no surface-blackening.

The samples treated in chloroform or methylene chloride under introduction of hydrogen chloride were self-extinguishing even by the treatment for a short time, for example for 30 minutes, while the combustibilities of the samples immersed in a medium free from hydrogen chloride, including the samples immersed for 24 hours, were comparable to those of untreated samples (Comparative Example 4) and the effect of the treatment was obvious.

More interestingly, the ratios of the weight increase of the treated samples were, without exception, smaller than those of the comparative examples subjected to the same treatment provided that the introduction of hydrogen chloride was omitted. The fact shows that there is almost no weight increase caused by the addition of hydrogen chloride. The development of good self-extinguishing property in spite of the above fact gives a definite suggestion that the mechanism of the self-extinguishing effect is different from the introduction of the halogen atom.

In any case, the treatment effect is remarkable. The heat-distortion temperature and notched Izod impact strength were measured on the sample of the Example 1—1 and the results were equal to those of untreated sample (Comparative Example 4). Accordingly, a molded article can be made self-extinguishing without causing a change in the original properties of the article by the proper selection of the treating conditions.

hours, at 40° C. for 4 hours, at 60° C. for 2 hours or at 80° C. for 1 hour. The heat-distortion temperature and impact strength of the sample having black-discolored surface were measured and the results were equal to those of the untreated sample.

The burning times of the samples were prolonged by about 20 seconds and the samples were not self-extinguishing according to the results of combustibility test, however, the article treated under the above conditions can be used as a black-colored article owing to the blackened surface, similar to the black-painted or black-pigmented article.

EXAMPLE 5

TABLE 1

| No. of Examples & Comparative Examples | Treating Conditions | | | Weight Increase (after drying) | Combustion Test | |
|---|---|---|---|---|---|---|
| | Introduction of HCl | Solvent | Treating Time (hr) | | Burning Time (min/10 cm) | Self-Extinguishing Time (min) |
| Example 1-1 | Yes | Chloroform | 0.5 | 4.7 | — | 1.1 |
| Comparative Example 1-1 | no | " | 0.5 | 4.9 | 3.2 | — |
| Example 1-2 | yes | " | 1 | 6.8 | — | 1.3 |
| Comparative Example 1-2 | no | " | 1 | 7.4 | 3.5 | — |
| Example 1-3 | yes | " | 2 | 9.2 | — | 1.0 |
| Comparative Example 1-3 | no | " | 2 | 9.9 | 3.2 | — |
| Example 1-4 | yes | " | 5 | 7.8 | — | 1.0 |
| Comparative Exmaple 1-4 | no | " | 5 | 10.6 | 4.7 | — |
| Example 1-5 | yes | " | 24 | 8.3 | — | 1.0 |
| Comparative Example 1-5 | no | " | 24 | 10.5 | 4.8 | — |
| Example 2-1 | yes | Methylene Chloride | 0.5 | 1.9 | — | 2.8 |
| Comparative Example 2-1 | no | Methylene Chloride | 0.5 | 1.5 | 3.8 | — |
| Example 2-2 | yes | Methylene Chloride | 10 | 4.8 | — | 2.0 |
| Comparative Example 2-2 | no | Methylene Chloride | 10 | 5.5 | 5.4 | — |
| Example 2-3 | yes | Methylene Chloride | 24 | 4.4 | — | 1.1 |
| Comparative Example 2-3 | no | Methylene Chloride | 24 | 4.6 | — | — |
| Example 3-1 | yes | p-Xylene | 5 | 6.9 | — | 2.0 |
| Comparative Example 3-1 | no | " | 5 | 7.3 | 4.6 | — |
| Example 3-2 | yes | " | 24 | 7.0 | — | 1.0 |
| Comparative Example 3-2 | no | " | 24 | 11.6 | 6.3 | — |
| Comparative Example 4 | no | — | — | 0 | 2.7 | — |

EXAMPLE 4

Samples the same as those used in the Example 1 were immersed in concentrated hydrochloric acid at normal temperature, 40° C., 60° C. and 80° C., respectively. The surface of the sample turned into glossy black by the treatment at normal temperature for 24

The treatment was carried out under the conditions of Example 1 except that hydrogen bromide was used in place of hydrogen chloride. The ratios of weight increase and combustibilities were measured and compared with those of samples treated without introducing hydrogen bromide. The results are collectively shown in Table 2.

TABLE 2

| No. of Examples & Comparative Examples | Treating Conditions | | | Weight Increase (after drying) | Combustion Test | |
|---|---|---|---|---|---|---|
| | Introduction of HCl | Solvent | Treating Time (hr) | | Burning Time (min/10 cm) | Self-Extinguishing Time (min) |
| Example 5-1 | yes | Chloroform | 0.5 | 2.9 | 4.2 | — |
| Comparative Example 5-1 | no | " | 0.5 | 2.4 | 3.2 | — |
| Example 5-2 | yes | " | 1 | 5.1 | 4.8 | — |
| Comparative Example 5-2 | no | " | 1 | 4.5 | 3.5 | — |
| Example 5-3 | yes | " | 2 | 9.4 | — | 3.1 |
| Comparative | no | " | 2 | 7.2 | 3.5 | — |

TABLE 2-continued

| No. of Examples & Comparative Examples | Treating Conditions | | | Weight Increase (after drying) | Combustion Test | |
|---|---|---|---|---|---|---|
| | Introduction of HCl | Solvent | Treating Time (hr) | | Burning Time (min/10 cm) | Self-Extinguishing Time (min) |
| Example 5-3 | | | | | | |
| Example 5-4 | yes | " | 5 | 12.5 | — | 1.2 |
| Comparative Example 5-4 | no | " | 5 | 9.9 | 4.7 | — |
| Example 5-5 | yes | " | 24 | 13.7 | — | 1.1 |
| Comparative Example 5-5 | no | " | 24 | 10.0 | 4.8 | — |

Different from the case of hydrogen chloride, the ratio of weight increase is a little larger in the sample treated with hydrogen bromide, suggesting the increase in the addition of bromine. However, the self-extinguishing property is attained until the treatment is continued for 2 hours or longer. Accordingly, the effect is inferior to the case of hydrogen chloride treatment to an extent. It is generally recognized that the flame-retarding effect of the introduction of halogen atom is larger for bromine than for chlorine. The results of the present example reinforce the suggestion that the flame-retarding effect of the hydrogen halide treatment of the present invention is caused not merely by the addition of the halogen atom.

We claim:

1. A method for treating a molded crosslinked polymer article prepared by reaction molding of a cycloolefin under the influence of a metathesis catalyst which method comprises contacting said crosslinked molded article with a hydrogen halide selected from the group consisting of hydrogen chloride, hydrogen bromide, hydrogen fluoride and hydrogen iodide in the presence of an organic solvent.

2. The method of claim 1 wherein the cycloolefin is at lest 50 to 100 mole % dicyclopentadiene.

3. The method of claim 2 wherein the solvent is a chlorinated hydrocarbon.

4. The method of claim 2 wherein the hydrogen halide is hydrogen chloride.

5. The method of claim 3 wherein the hydrogen halide is hydrogen chloride.

6. A method of treating the surface of a molded crosslinked polymer article prepared by reaction molding of a cycloolefin under the influence of a metathesis catalyst which method comprises contacting said crosslinked molded article with a hydrogen halide selected from the group consisting of hydrogen chloride, hydrogen bromide, hydrogen fluoride and hydrogen iodide in the presence of water.

7. The method of claim 6 wherein the cycloolefin is 50 to 100 mole % dicyclopentadiene.

8. The method of claim 7 wherein the hydrogen halide is hydrogen chloride.

9. The method of claim 7 wherein the hydrogen halide is hydrogen bromide.

10. A method of producing a flame retardant molded crosslinked polymer article wherein said molded polymer is produced by the reaction molding of at least one metathesis polymerizable cycloolefin in the presence of a metathesis polymerization catalyst which method comprises contacting said crosslinked molded polymer with a solution of a hydrogen halide selected from the group consisting of hydrogen chloride, hydrogen bromide, hydrogen fluoride and hydrogen iodide in an organic solvent at a temperature between normal temperature and about 100° C. for about 30 minutes to 24 hours, wherein said organic solvent has high swelling power.

11. The method of claim 10 wherein the cycloolefin is 50 to 100 mole % dicyclopentadiene.

12. The method of claim 10 wherein said organic solvent of said hydrogen halide is selected from the group consisting of halogenated hydrocarbons having one to six carbon atoms, aromatic hydrocarbons having six to nine carbon atoms, halides of aromatic hydrocarbons, and halogenated paraffins.

13. The method of claim 12 wherein said hydrogen halide is hydrogen chloride.

14. The method of claim 13 wherein said organic solvent is selected from the group consisting of chloroform, methylene chloride, and p-xylene.

15. A method for treating a molded crosslinked polymer article prepared by reaction molding of a cycloolefin which is 50 to 100 mole % dicyclopentadiene under the influence of a metathesis catalyst which method comprises contacting said crosslinked molded article with a hydrogen halide selected from the group consisting of hydrogen chloride, hydrogen bromide, hydrogen fluoride and hydrogen iodide in the presence of an organic solvent.

16. The method of claim 15 wherein the solvent is a chlorinated hydrocarbon.

17. The method of claim 15 wherein the hydrogen halide is hydrogen chloride.

* * * * *

UNITED STATES PATENT AND TRADEMARK OFFICE
CERTIFICATE OF CORRECTION

PATENT NO. : 5,045,362
DATED : September 3, 1991
INVENTOR(S) : S. Hara and U. Nakatani (Case 1)

It is certified that error appears in the above-identified patent and that said Letters Patent is hereby corrected as shown below:

Table 2 at the bottom of Columns 9 and 10 and Table 2(Continued) at the top of Columns 11 and 12, in each instance, the second column heading "Introduction of HCl" should read --Introduction of HBr--; and in the fifth column heading "Weight Increase (after drying)" should read --Weight Increase--; and In the Claims, Col. 11, line 41, "lest" should read -- least --.

Signed and Sealed this

Sixteenth Day of February, 1993

Attest:

STEPHEN G. KUNIN

*Attesting Officer*    *Acting Commissioner of Patents and Trademarks*